Nov. 8, 1955     E. E. KUHARY ET AL     2,722,988
TRACTOR WHEEL SPACING MEANS
Filed Nov. 12, 1953     2 Sheets-Sheet 1
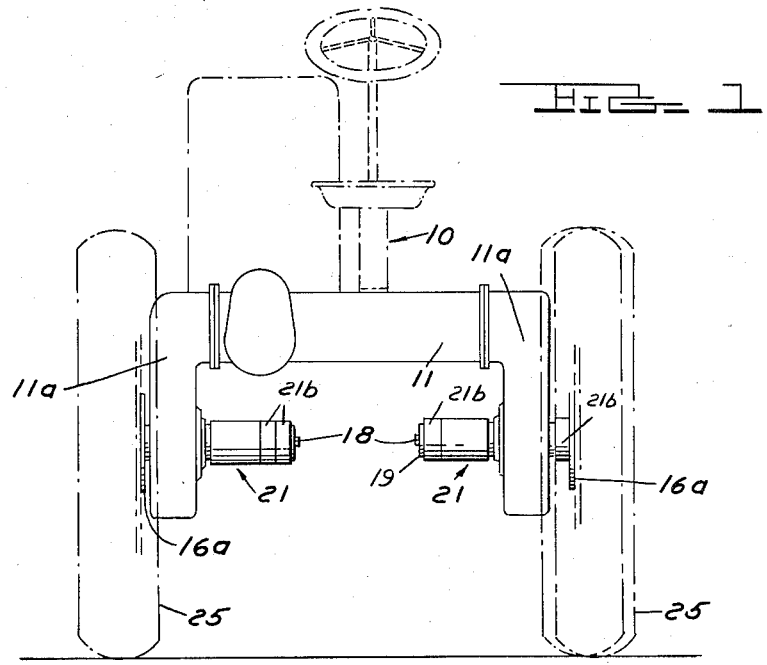
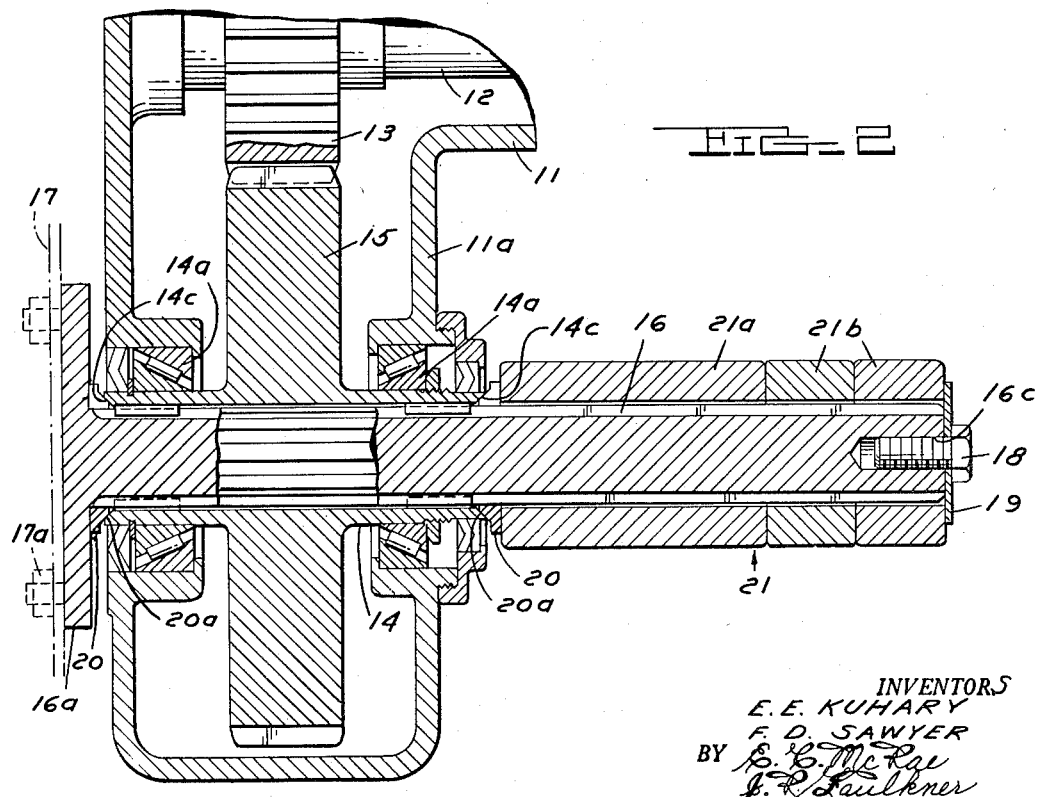
INVENTORS
E. E. KUHARY
F. D. SAWYER
ATTORNEYS Nov. 8, 1955     E. E. KUHARY ET AL     2,722,988
TRACTOR WHEEL SPACING MEANS
Filed Nov. 12, 1953     2 Sheets-Sheet 2
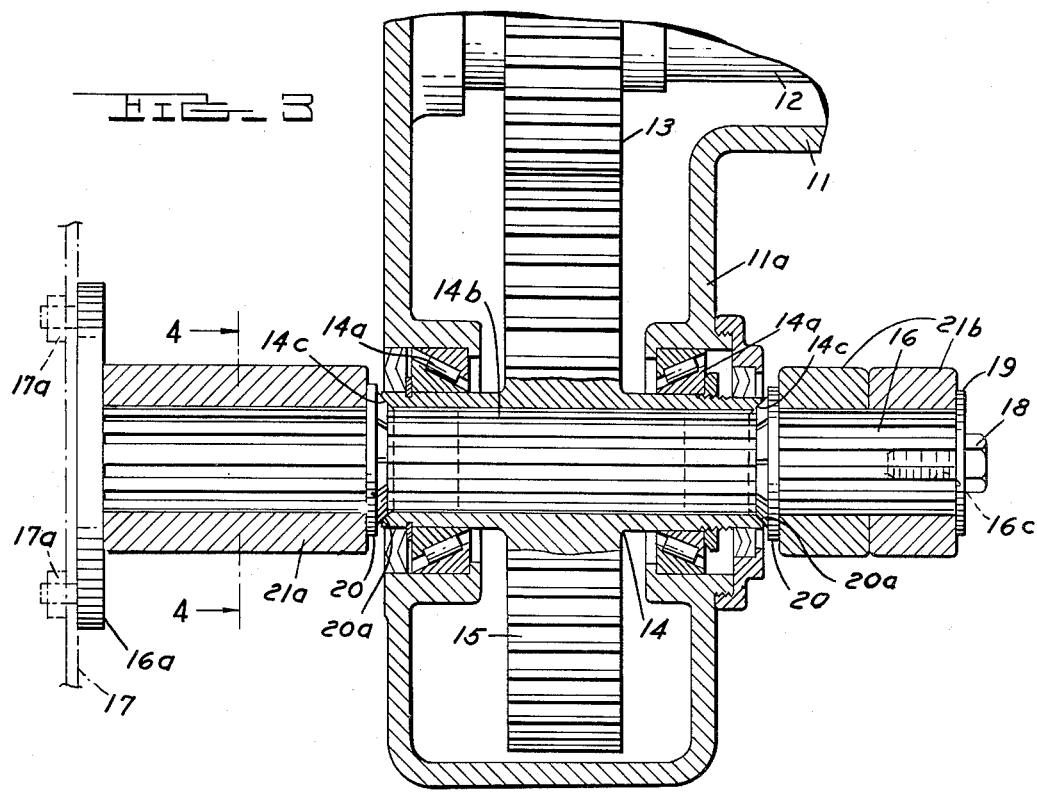
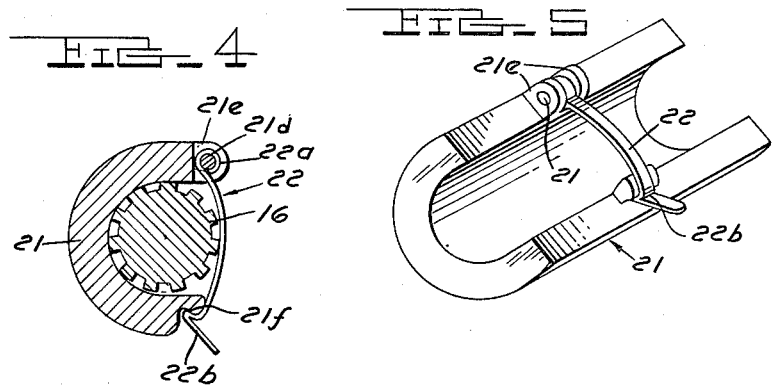
INVENTORS
E. E. KUHARY
F. D. SAWYER
ATTORNEYS

United States Patent Office 2,722,988
Patented Nov. 8, 1955

2,722,988

TRACTOR WHEEL SPACING MEANS

Emery E. Kuhary, Royal Oak, and Frederick D. Sawyer, Birmingham, Mich., assignors to Ford Motor Company, Dearborn, Mich., a corporation of Delaware Application November 12, 1953, Serial No. 391,473

2 Claims. (Cl. 180—75)

This invention relates to an improved adjustable wheel spacing mechanism for agricultural type tractors.

The problem of conveniently adjusting the lateral spacing of the rear wheels of agricultural type tractors to accommodate various crop and operating conditions has long been recognized in the art and a variety of mechanisms have heretofore been proposed for such purposes.

One of the most essential characteristics of such wheel spacing mechanisms is that the spacing adjustment can be accomplished without requiring the farmer to lift or otherwise handle the tractor wheel being adjusted. Such wheels are commonly filled with fluid or provided with wheel weights so that it is common for an individual wheel to weigh anywhere from 500 to 1000 pounds, which is much more than can be conveniently or safely handled or manipulated.

Accordingly, it is an object of this invention to provide an improved, economically manufacturable wheel spacing adjustment for agricultural type tractors, characterized by the fact that the spacing adjustments may be accomplished without removal of the wheel from its supporting axle.

Still another object of this invention is to provide a tractor wheel spacing adjusting mechanism which permits selective incremental adjustment of the tractor wheel spacing by the selective interposition of spacer elements between the wheel and the tractor axle housing.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

Figure 1 is a schematic rear elevational view of a tractor incorporating a rear wheel spacing adjustment mechanism in accordance with this invention.

Figure 2 is an enlarged scale, partial vertical sectional view taken on a plane passing vertically through the axis of one of the tractor wheels.

Figure 3 is a view similar to Figure 2 but illustrating a different selective arrangement of the spacer elements to provide a different wheel spacing.

Figure 4 is a sectional view taken on the plane 4—4 of Figure 3.

Figure 5 is a perspective view of one of the spacer elements.

As shown on the drawings:

This invention is preferably applied to a tractor 10 of the type having a final drive reduction gear incorporated in depending axle housings 11a which are respectively mounted at the outer ends of a differential housing 11.

As best shown in Figures 2 and 3, the drive from the tractor engine is transmitted to each of the axle housings 11a respectively by shafts 12 on the outer end of each of which is mounted a pinion 13. An axle sleeve 14 is journaled in the lower portion of each axle housing 11a by suitable anti-friction bearings units 14a. A gear 15 is rigidly secured in surrounding relationship to sleeve 14 and meshes with pinion 13 to transmit driving power to the sleeve 14. The bore of sleeve 14 is longitudinally splined as indicated at 14b and such bore slidably receives a correspondingly splined axle 16. Axle 16 is of substantially greater length than sleeve 14 and hence portions of axle 16 project out of both ends of sleeve 14. A wheel mounting flange 16a is integrally formed on one end of axle 16 and is provided with the customary bolt circle holes to mount a wheel disc 17 by means of bolts 17a. The other end of shaft 16 is provided with a threaded axial hole 16c which receives a bolt 18 upon which is mounted a stop washer 19. Additionally a pair of internally splined spacer washers 20 are provided for slidable mounting on shaft 16 and such washers have tapered end surfaces 20a which are respectively adapted for cooperation with corresponding tapered end surfaces 14c formed on the end of sleeve 14.

From the construction thus far described, it is apparent that each axle unit 16 may be laterally adjusted relative to the driving sleeve 14 to the extent permitted by the excess in length of axle 16 over the length of sleeve 14. In accordance with this invention, a plurality of spacer elements 21 are provided which are detachably mounted on axle 16 so as to lock axle 16 in any selected lateral position with respect to the axle housing 11a. While any desired number of spacer elements 21 may be provided, depending only upon the desired number of increments of adjustment of wheel spacing, the construction illustrated in the drawings advantageously utilizes three such spacer elements, respectively a large spacer 21a and two identical smaller spacers 21b.

As best shown in Figures 4 and 5, each spacer element is preferably constructed of U-shaped configuration so that it may be conveniently slipped on to axle 16 from a radial direction. To detachably secure each spacer element 21 in its mounted position relative to the axle 16, a latch 22 is provided which may conveniently comprise a leaf spring element which has one end 22a curled to form a mounting to receive a pin 21d which is supported by integral lugs 21e formed on one arm of spacer 21. The free end of leaf spring latch 22 is bent to define a latching shoulder 22b which cooperates with a notch 21f integrally formed on the other arm of U-shaped spacer 21: hence each spacer 21 may be conveniently manually latched in assembly on axle 16. In the arrangement of the spacer elements 21 illustrated in Figure 2, the wheel disc 17 is adjusted to its minimum tread position wherein the axle flange 16a is separated from the adjacent end of sleeve 14 merely by the spacing collar 20. In this position, all of the excess length of axle 16 is disposed on the inward side of axle housing 11a and hence all of the spacer elements 21 are mounted on such inward side. Obviously, the overall length of the spacer elements is proportioned to snugly fill the space along shaft 16 defined between the stop washer 19 and spacer sleeve 20. In the event that it is desired to increase the wheel tread of the tractor, such may be conveniently done by jacking up the tractor housing 11a so that the corresponding wheel is supported off the ground, then removing a number of spacer elements 21, corresponding to the desired change in tread, from the axle 16. The entire wheel and axle assembly may then be manually shifted outwardly relative to the rear axle housing 11a, for example to the position illustrated in Figure 3, and then the removed spacer elements 21 are remounted on the axle 16 but on the outward side of the axle so as to positively retain the wheel disc 17 in its new tread position.

Obviously, additional increments of tread adjustment can be obtained by successively shifting the remaining spacer elements 21 from the inward side of axle 16 to the outward side. It should be noted that in all such adjustments the wheel 25 remains mounted on axle 16 and its entire weight is supported by axle housing 11a so that it need never be lifted by the operator.

It will, of course, be understood that various details of construction may be varied through a wide range without departing from the principles of this invention and it is, therefore, not the purpose to limit the patent granted hereon otherwise than necessitated by the scope of the appended claims.

We claim:

1. In a tractor having a rear axle housing laterally terminating in depending gear housings, a sleeve journaled in each of said housings in an axially fixed position, means within said housing for driving said sleeve, an axle slidably insertable in said sleeve and keyed thereto for co-rotation, said axle projecting out of both ends of said sleeve, means for mounting a wheel on the laterally outer end of said axle, means defining a stop on the laterally inward end of said axle, the over-all length of said axle being substantially greater than the axial length of said sleeve, and spacer means selectively mountable on said axle on either side of said sleeve and cooperable with said stop and said sleeve to prevent axial shifting of said axle, thereby permitting selective positioning of said wheel mounting means in a plurality of lateral positions.

2. The combination defined in claim 1 wherein said spacer means comprises a plurality of U-shaped members having spaced arm portions adapted to straddle said shaft and releasable means for preventing separation of said members from said shaft.

References Cited in the file of this patent

UNITED STATES PATENTS

| | | |
|---|---|---|
| 2,302,570 | Peterson | Nov. 17, 1942 |
| 2,378,615 | Brown | June 19, 1945 |

FOREIGN PATENTS

| | | |
|---|---|---|
| 7,801 | Netherlands | Jan. 15, 1923 |